May 6, 1952 — J. D. NAILLON — 2,595,599
ADJUSTABLE RACK FOR HANDLING BRICKS AND THE LIKE
Filed Sept. 8, 1947 — 3 Sheets-Sheet 3

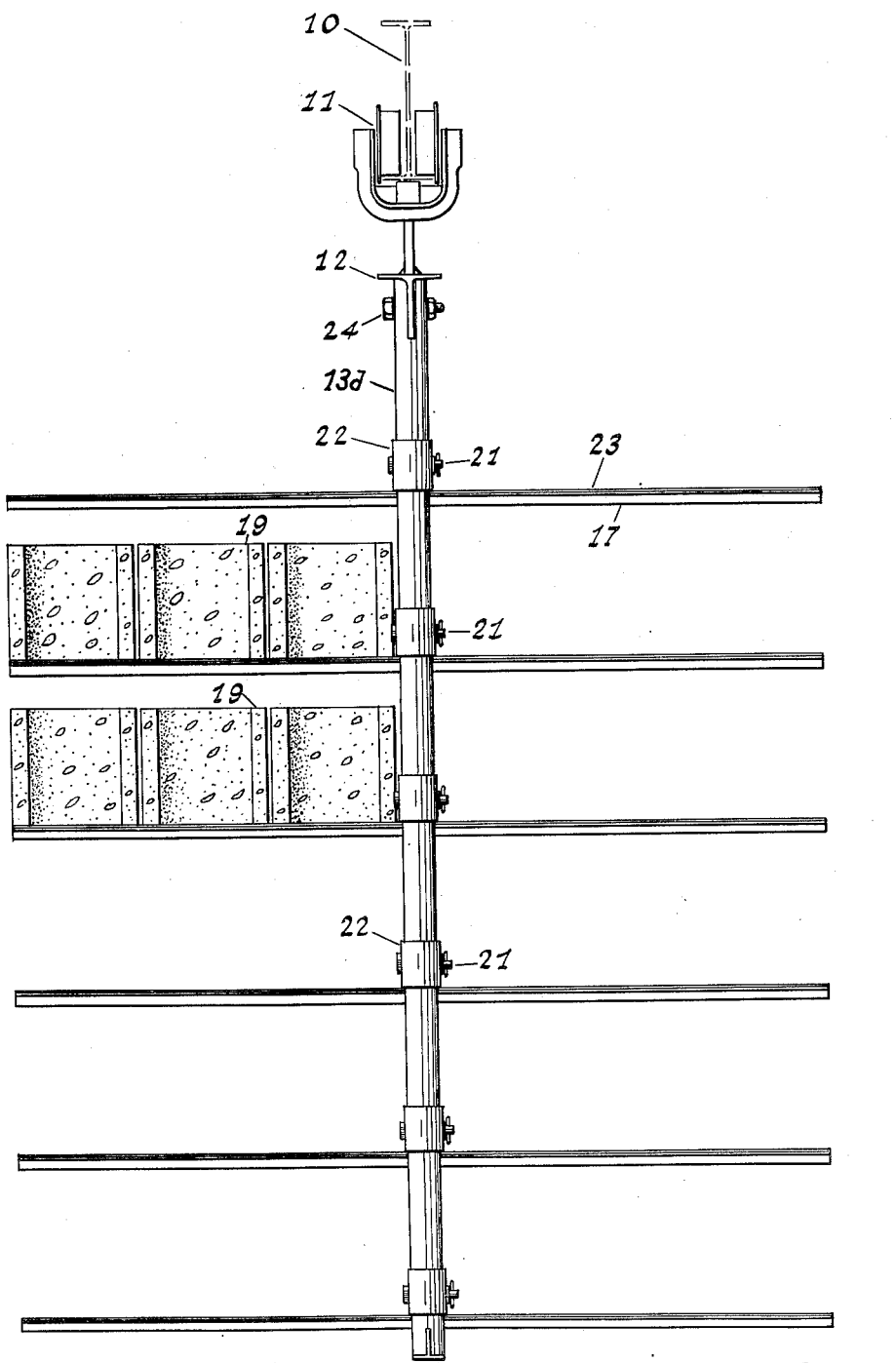

Inventor
Jacob D. Naillon

Patented May 6, 1952

2,595,599

UNITED STATES PATENT OFFICE 2,595,599

ADJUSTABLE RACK FOR HANDLING BRICKS AND THE LIKE

Jacob D. Naillon, Oakland, Calif.

Application September 8, 1947, Serial No. 772,771

11 Claims. (Cl. 211—147)

This invention relates to the art of handling materials and is, more particularly, concerned with a rack which may may be adjusted for handling objects of various sizes. The invention finds especial application in the movement of bricks, such as concrete masonry, and similar objects which are manufactured in standardized or uniform sizes, but is not limited thereto, being also useful for the handling of other objects which may be placed on trays or pallets.

The embodiment of the invention described in detail in this specification is designed particularly for handling concrete masonary bricks and is intended to be used in conjunction with the telescoping carrier and spacing machine described in my patent application Serial No. 772,772 filed concurrently with this application. In the manufacture of such bricks out of concrete, the blocks or bricks are formed by means of suitable molds and placed on pallets or hacking boards. The loaded pallets are then moved into a curing chamber wherein the bricks are subjected to live steam for several hours, resulting in rapid curing. The pallets are thereafter removed from the curing chamber and the bricks unloaded and stacked in a storage yard.

The adjustable rack according to the instant invention is particularly suitable for transporting the loaded pallets into and out of the curing chamber and for supporting the pallets while the bricks are being cured and while they are being unloaded from the pallets. The actual unloading of the bricks is performed by the telescoping carrier and spacing mechanism described in the aforesaid patent application.

Bricks are frequently manufactured at the same plant in different sizes, often having only one dimension altered. Thus, in the case of concrete masonry bricks, two common sizes are 8 in. x 8 in. x 16 in., and 4 in. x 8 in. x 16 in. The bricks are placed with their 8 in. x 16 in. faces on the pallets, regardless of the third dimension, so that the same number of large or small bricks are placed on a pallet of a given size. When the pallets are placed in racks for movement it is desirable to stack twice as many pallets in each vertical tier in the case of small bricks as in the case of large bricks, the height of the tier being the same in either case. This is desirable not only for the sake of space economy but to permit full utilization of the unloading machine, which is capable of handling twice as many small size bricks as large size bricks in one operation if the bricks are positioned with the proper vertical intervals.

It is, however, a requirement of unloading devices of some types, such as, for example the telescoping carrier and spacing machine of my previously mentioned copending patent application, that there be no obstructions between vertically adjacent pallets at the levels of the bricks. In racks of the type described herein the pallets are supported on transverse supporting beams, i. e., by beams extending laterally from the vertical plane of the supporting monorail or direction of movement of the rack. In the unloading operation gripping arms are moved inwardly from the sides parallel to the beams to grip the bricks; thereafter the rack or the unloading device is moved away in a longitudinal direction. It is evident that in a rack which is constructed for accommodating a given number of small size bricks on pallets which are closely spaced vertically cannot be used for handling half the number of pallets bearing full size bricks unless the intervening supporting beams are first removed from the intervening spaces.

It is an object of this invention to provide an adjustable rack; suitable for supporting a plurality of vertically stacked pallets which can be altered for handling a different number of pallets in the stack while leaving the space between pallets free from obstruction.

It is a further object to provide a rack of the type described which can be rapidly and easily adjusted to provide a greater or lesser number of supporting beams for pallets.

Still a further object is to provide a rack for supporting a plurality of vertically stacked pallets by means of horizontal supporting beams in which the supporting beams can be nested by a simple operation, thereby providing, optionally, a larger number of single beams at different levels, or a smaller number of plural beams at a lesser number of levels.

Another object is to provide a rack suitable for carrying pallets loaded with solid objects, such as bricks, which is adapted to be supported from an overhead monorail for movement and is provided with a plurality of horizontal beams for supporting the pallets in one or more vertical stacks.

A specific object is to provide an adjustable rack of the type indicated in the foregoing objects in which alternate pallet supporting beams are fixed directly to a vertical column and the remainder of the supporting beams in the same vertical row are connected to a slidable column or tube which is vertically adjustable with respect to the first column.

With these and other objects in view, which will become obvious in part and be pointed out in part in the course of the following description of the elements and applications of principles constituting the invention, reference is made to the accompanying drawings forming a part of this specification and illustrating a specific embodiment of the invention, wherein:

Fig. 2 is an end elevation view of the rack shown in Fig. 1;

Figure 1:
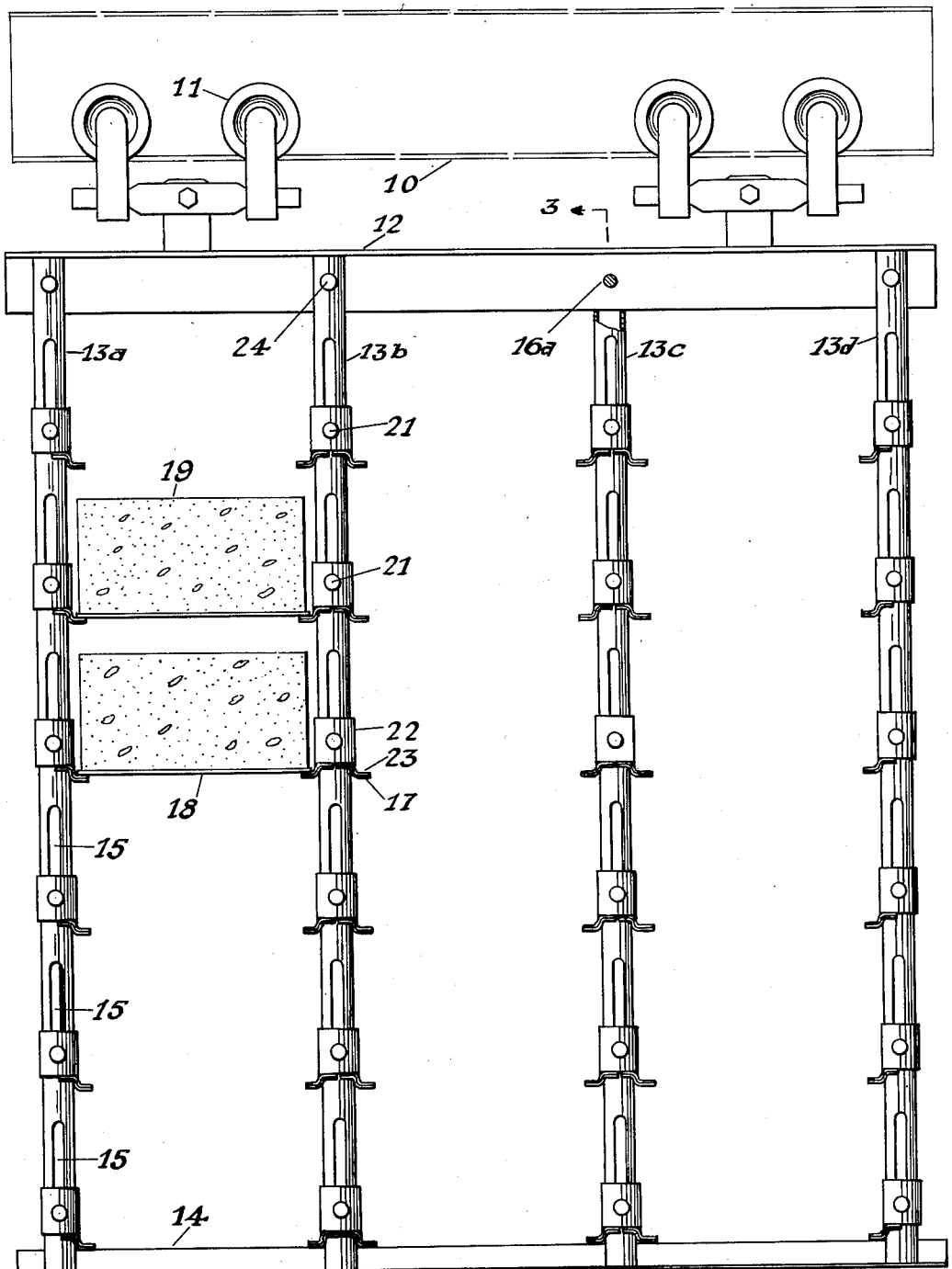
Fig. 1 is an elevation view of a rack constructed in accordance with the invention adjusted for supporting pallets loaded with large concrete masonry bricks.

Briefly, the improved rack according to the instant invention comprises a plurality of columns, arranged in any suitable configuration, such as a longitudinal row at the center plane of the rack, and interconnected to form a rigid frame. A plurality of transverse supporting beams are provided at different levels on each column for supporting the pallets, there being preferably one or more vertical tiers of pallets between each pair of adjacent columns. When the rack is suspended from an overhead structure it is desirable to balance the loads on the sides of the rack; this is effected by securing the transverse supporting beams so that their midpoints are opposite the columns, permitting an equal number of pallets to be supported on each side of the columns, although such an arrangement is not in all cases essential.

To adapt the rack for supporting a greater or a lesser number of pallets, alternate beams are fixed to the aforesaid columns and intermediate beams are vertically movable along said columns, e. g., slidably mounted, the movable beams being interconnected by supporting means, such as slidable columns, to maintain their proper relative vertical spacings. The movable beams are arranged so that they can be moved into engagement with the corresponding fixed beams, either above or below, thereby forming double transverse beams; for maximum space economy each movable beam nests in a fixed beam. In the preferred form the movable beams are above their corresponding fixed beams when in engagement therewith, thereby preventing accidental displacement of the movable beams. When the beams are thus in engagement pallets are placed only on the upper beam of each pair of engaged beams. When the movable beams are displaced along the column pallets may be placed both on the fixed beams and the movable beams. It is, of course, not necessary that every alternate transverse beam be fixed, and a greater or lesser number of beams may be fixed, depending upon the specific purpose of the rack. For example, every third beam may be fixed and the remaining beams may be connected to two separate slidable columns, whereby the vertical intervals between the fixed beams may be divided into intervals one third of the full interval.

Referring to the drawing, 10 represents a monorail attached to structural parts of a building or to a frame, not shown, for supporting the rack and permitting it to be moved about within the plant. The rack is suspended by means of eight wheels 11, journalled on spindles carried by a longitudinal T-beam 12 which forms the upper part of the rack frame. Four vertical tubular columns, 13a, 13b, 13c and 13d are rigidly connected to the T-beam by arc welding, the upper ends of the columns having notches for receiving the vertical web of the T-beam. The lower ends of the columns are also notched and are similarly attached to a lower, inverted T-beam 14. Each column is provided with a plurality of vertical slots 15, spaced apart vertically as will be explained presently. The slots are disposed laterally in pairs, one slot on each side of the column. A hole 16 is provided near the top of each column for receiving a locking pin or bolt; these are aligned with holes 16a in the T-beam.

Beneath each slot 15 is a fixed transverse beam 17, secured at its center to the vertical column by arc welding or other means. Each beam on the inner column 13b or 13c is formed of two symmetrically shaped plate sections having cross-sections similar to those of the movable beams 23 shown in Fig. 4. The beams on the outer column 13a or 13d consist of only single plate sections. Each plate section has an elevated, horizontal portion 17a adjacent to the column; a downwardly extending face 17b; and a horizontal shoulder 17c extending outwardly from the bottom of the face 17b. The shoulders 17c are adapted to support pallets 18 carrying bricks 19, and the faces 17b are positioned to engage the edges of the pallets for retaining them on the shoulders. The vertical spacing of the fixed transverse beams 17 is such as to permit large size bricks 19 to be placed on the pallets with a minimum waste of vertical space between the top of the bricks and the bottom of the pallets next above them, but allowing sufficient clearance for the insertion of another pallet and, in addition, space for slight vertical movement of the bricks, so as to permit the unloading of the bricks by lifting them an inch or so from the pallets and then moving the rack away from the unloading device which holds the bricks clamped in their raised position.

Figure 4:
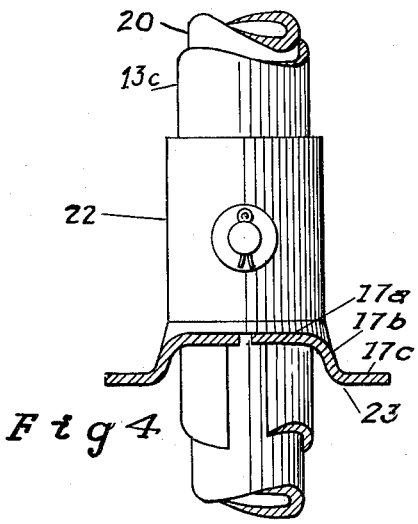
Fig. 4 is an enlarged sectional view taken on line 4—4 of Fig. 3, showing one of the slidable bushings and the movable supporting beam attached thereto.
Figure 5:
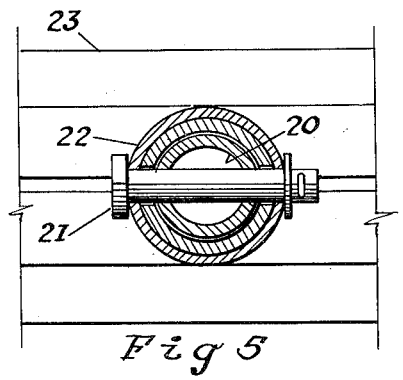
Fig. 5 is an enlarged horizontal sectional view taken on line 5—5 of Fig. 3, showing the telescoping columns and one of the slidable bushings.
Figure 6:
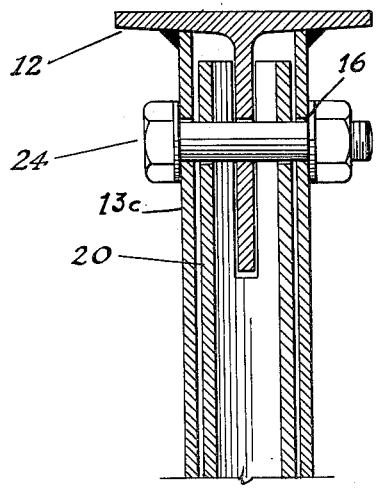
Fig. 6 is an enlarged detail view of the upper portion of Fig. 3.

Each fixed vertical column contains within it a slidable column 20, also formed of a piece of tubing, and having fixed thereto a plurality of pins 21 extending laterally through the vertical slots 15, there being one pin for each pair of oppositely disposed slots. Each pin 21 further passes through diametrically opposite holes of a bushing 22 which is slidably mounted about the fixed tubular column, as shown in detail in Fig. 5, there being a separate bushing 22 for each pin 21. Each bushing 22 carries a movable transverse beam 23, shaped as previously described for beam 17, and of the same length, and similarly adapted to support pallets. As shown in Figs. 4 and 5, the movable beams 23 on slidable bushings on an inner fixed column 13b or 13c are formed of two symmetrical plate sections; those on bushings on an outer column 13a or 13d consist of single plate sections. The movable beams 23 have their downwardly extending faces spaced away from the columns somewhat farther than in the case of the fixed beams, so as to permit each movable beam to nest over the corresponding fixed beam 17, as shown in Figs. 1 and 2, thereby providing a minimum loss of vertical space and insuring better engagement between the beams. Because all movable beams are carried by bushings which are vertically fixed to the slidable columns, all movable beams associated with the same column can be moved in unison. When in their lower positions they rest on the fixed beams 17, and when raised they assume the positions shown in Fig. 3, i. e., midway between adjacent fixed beams. To retain the movable beams in these raised positions a removable locking bolt 24 may be inserted through each hole 16, 16a and a corresponding hole near the top of each slidable column 20 (see Fig. 6). When the columns 20 are in their lower positions the bolts 24 pass through the columns 13a—13d above the upper ends of the columns 20.

In using the rack for carrying large size bricks the bolts 24 are removed; the movable beams on all columns are then shifted to their lower positions and the bolts may be replaced. Two pallets are placed on each movable pair of beams, one on each side of the central row of vertical columns. There being six movable beams on each vertical column, twelve pallets will be accommodated between each pair of vertical columns. In the case of concrete masonry, three large bricks, i. e., 8 in. x 8 in. x 16 in. bricks, are placed on each pallet with the longest axes of the bricks parallel to the T-beam 12. A total of 108 bricks can thus be carried. By nesting the beams part of the load is transmitted to the fixed beams.

Figure 3:
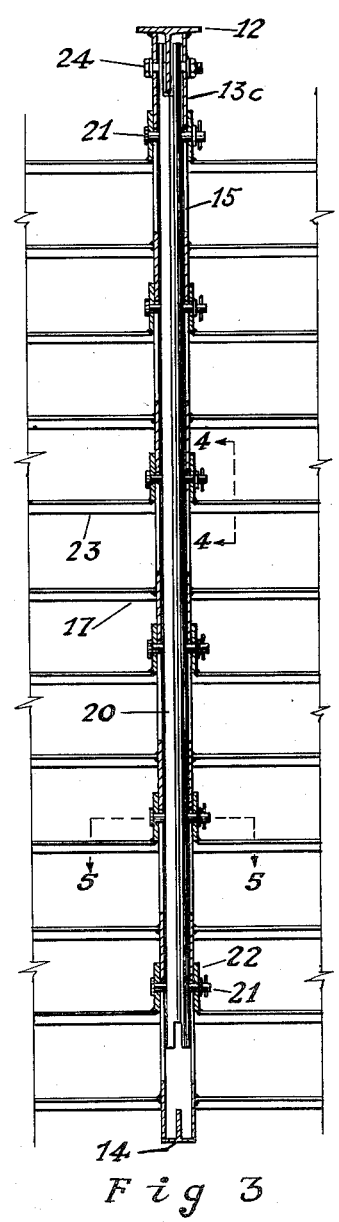
Fig. 3 is a sectional view, taken on line 3—3 of Fig. 1, showing the rack adjusted for supporting twice as many pallets as in Fig. 1, for accommodating half size bricks.

When the rack is to be used for carrying smaller bricks, e. g., concrete masonry having dimensions of 4 in. x 8 in. x 16 in., the movable beams are raised to the positions indicated in Fig. 3 and locked by means of the bolts 24. Pallets are now placed on the fixed beams and on the movable beams, thereby being twice as many as previously. The bricks are placed on the pallets with their longest axes parallel to the T-beams and their shortest axes vertical, so that the rack now accommodates 216 bricks.

It will be seen that the rack is easily adjustable to accommodate a variable number of bricks of different sizes, and that the vertical spaces between pallets are free from obstructions in either adjusted position. The latter feature is particularly important when the rack is to be used in connection with a carrier or unloading device which grips the bricks on pallets by means of arms extending transversely, i. e., parallel to the beams 17 and 23. Following such gripping action it is necessary for the rack to be moved clear of the carrier, as by movement along the monorail 10, the bricks remaining in the carrier, necessitating such freedom from obstruction.

While I have shown a rack having four columns and six fixed beams on each column, it is evident that these are merely exemplary of the preferred mode of practicing the invention and that the invention may be embodied in other forms.

I claim as my invention:

1. An adjustable rack comprising: a plurality of columns; a plurality of fixed beams attached to each column extending transversely to the plane of said columns at different levels and adapted to support pallets; a plurality of movable beams vertically slidably mounted on each column extending transversely to the plane of said columns at levels corresponding to the levels of said fixed beams, said movable beams being adapted to support pallets, and being interconnected by means movable vertically with respect to the columns and together with said movable beams and maintaining their vertical spacings during and following vertical movement; and means for locking said movable beams in a raised position.

2. The rack according to claim 1 wherein the columns are arranged in a row centrally of the rack and the transverse beams extend laterally on both sides of said row of columns.

3. An adjustable rack comprising: a pair of columns; a plurality of fixed beams attached to each column extending transversely to the plane of said columns at different uniformly spaced levels and adapted to support pallets; a plurality of movable beams vertically slidably mounted on each column substantially parallel to and resting on said fixed beams and adapted to support pallets; spacer means interconnecting said movable beams for maintaining their vertical spacings equal to the vertical spacings of said fixed beams; and means for locking said movable beams in raised position such that all movable beams intermediate to fixed beams are midway between such fixed beams.

4. The rack according to claim 3 wherein the fixed and movable beams are constructed of bent plate sections providing an upper and a lower horizontal portion and an intermediate substantially vertically extending portion, said lower horizontal portions being adapted to support pallets and said intermediate portion being adapted to retain the edges of said pallets.

5. The rack according to claim 4 wherein the movable beams are shaped to nest over the fixed beams.

6. An adjustable rack comprising: a frame having a plurality of substantially vertical fixed columns; a plurality of fixed transverse beams on each fixed column attached thereto at different levels so as to extend laterally on both sides of the frame, said beams being adapted to support pallets; a slidable column for each fixed column slidably secured thereto; a plurality of movable transverse beams on each slidable column secured in fixed vertical relation to their respective slidable columns, said movable beams being vertically slidably mounted with respect to the fixed columns associated with the respective slidable columns and being vertically spaced along their respective slidable columns to correspond to the vertical spacings of the fixed beams on the fixed columns, said movable beams being parallel to and in engagement with said fixed beams and adapted to support pallets, whereby said movable transverse beams may be moved in unison to positions spaced from said fixed beams; and means for locking said slidable column in a raised position with respect to said fixed column.

7. An adjustable rack comprising: a frame having a plurality of substantially vertical tubular columns joined together rigidly at their upper and lower ends by longitudinal beams and having a plurality of vertical slots at different levels; wheels secured to the upper longitudinal beam and adapted to suspend the frame from an overhead monorail; a plurality of fixed transverse beams on each vertical tubular column, each fixed beam being rigidly attached substantially at its midpoint to a tubular column near one end of a vertical slot thereof so as to extend laterally on each side of said frame, said fixed beams being adapted to support pallets; a slidable column within each tubular column; a plurality of movable transverse beams connected substantially at their midpoints to each of said slidable columns by means including pins extending through said vertical slots and being disposed parallel to and in engagement with said fixed beams, there being a movable beam for each fixed beam, said movable beams being vertically slidable along the respective tubular columns and being vertically spaced along the slidable columns to correspond to the vertical spacings of the fixed beams on the tubular columns, said movable beams being adapted to support pallets, whereby said movable transverse beams may be moved in unison to positions vertically spaced from said fixed beams; and means for locking said slidable column in a raised position with respect to said tubular column.

8. The rack according to claim 7 wherein the fixed transverse beams are secured to the tubular columns at the lower ends of the respective vertical slots, and the movable transverse beams are arranged above the corresponding fixed transverse beams so as to rest thereon when in their lower positions.

9. The rack according to claim 8 wherein the fixed and the movable transverse beams are formed of bent plate sections having horizontal shoulders for supporting pallets and vertical faces for retaining the edges of said pallets, the movable beams being shaped to nest over the fixed beams when in engagement therewith.

10. The rack according to claim 7 wherein the movable transverse beams are connected to the slidable column by means of bushings slidably mounted about the tubular column, said pins extending through said vertical slots in the tubular column and through holes in said bushing, and the movable beams being rigidly secured to said bushings.

11. An adjustable rack comprising, in combination, a plurality of substantially vertical columns, a plurality of transverse beams attached to each of said columns vertically free at their ends away from the columns, said beams being adapted to support pallets, some of said beams being fixed to said columns at different levels, and others of said beams being disposed intermediate to the fixed beams and adjacent to fixed beams, and being vertically adjustable on said columns so as to be movable from the fixed beams into positions spaced therefrom, and spacer means located away from said vertically free ends of the beams interconnecting the vertically adjustable beams and vertically movable therewith relatively to the columns for maintaining their vertical spacings during and following vertical movement.

JACOB D. NAILLON.

REFERENCES CITED

The following references are of record in the file of this patent:

UNITED STATES PATENTS

| Number | Name | Date |
|---|---|---|
| 431,745 | Hayen | July 8, 1890 |
| 454,259 | Daniels | June 16, 1891 |
| 505,017 | Anthony | Sept. 12, 1893 |
| 639,549 | Fitzgerald | Dec. 19, 1899 |
| 1,019,384 | Walz | Mar. 5, 1912 |
| 1,169,157 | Honold | Jan. 25, 1916 |
| 1,169,720 | Harris | Jan. 25, 1916 |
| 1,745,784 | Davis | Feb. 4, 1930 |

FOREIGN PATENTS

| Number | Country | Date |
|---|---|---|
| 588,668 | Germany | Nov. 23, 1933 |
| 741,980 | France | Dec. 20, 1932 |